United States Patent
Kanbara

(10) Patent No.: US 11,229,098 B2
(45) Date of Patent: Jan. 18, 2022

(54) DIMMING CIRCUIT

(71) Applicant: ROHM CO., LTD., Kyoto (JP)

(72) Inventor: Daisuke Kanbara, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/943,450

(22) Filed: Jul. 30, 2020

(65) Prior Publication Data

US 2021/0045205 A1    Feb. 11, 2021

(30) Foreign Application Priority Data

Aug. 9, 2019 (JP) .............................. JP2019-147634

(51) Int. Cl.
| | |
|---|---|
| *B60Q 1/14* | (2006.01) |
| *H05B 45/30* | (2020.01) |
| *H05B 45/14* | (2020.01) |
| *F21S 41/155* | (2018.01) |
| *H05B 45/32* | (2020.01) |
| *F21Y 115/15* | (2016.01) |

(52) U.S. Cl.
CPC ........... *H05B 45/14* (2020.01); *B60Q 1/1415* (2013.01); *F21S 41/155* (2018.01); *H05B 45/32* (2020.01); *F21Y 2115/15* (2016.08)

(58) Field of Classification Search
CPC ...... B60Q 1/14; B60Q 1/1407; B60Q 1/1415; H05B 45/10; H05B 45/14; H05B 45/30; H05B 45/325; H05B 45/37; H05B 45/395
See application file for complete search history.

(56) References Cited

U.S. PATENT DOCUMENTS

| | | | | |
|---|---|---|---|---|
| 5,117,178 A | * | 5/1992 | Roth ..................... | H05B 47/14 323/320 |
| 2015/0334802 A1 | * | 11/2015 | Ryu ...................... | H05B 45/10 315/193 |
| 2017/0027034 A1 | * | 1/2017 | Nozawa ................ | H05B 45/38 |
| 2017/0354008 A1 | * | 12/2017 | Eum ..................... | H02M 1/08 |
| 2018/0192491 A1 | * | 7/2018 | Liu ....................... | H05B 45/395 |

FOREIGN PATENT DOCUMENTS

JP            2015-74309            4/2015

* cited by examiner

*Primary Examiner* — Thai Pham
(74) *Attorney, Agent, or Firm* — Fish & Richardson P.C.

(57) ABSTRACT

The present disclosure provides a high-precision dimming circuit.
A dimming circuit (107) includes an input stage (IN) and an output stage (OUT). The input stage (IN) includes a plurality of amplifiers (AMP1 to AMP3) which have non-inverted input terminals (+) thereof inputted with different dimming input voltages (DCDIM1, DCDIM2 and VH), respectively, and inverted input terminals (−) thereof inputted with a common dimming output voltage (V3). The output stage (OUT) is connected between respective output terminals of the plurality of amplifiers (AMP 1 to AMP3) and an output node of the diming output voltage (V3), and outputs, among the plurality of dimming input voltages (DCDIM1, DCDIM2 and VH) respectively inputted to the plurality of amplifiers (AMP1 to AMP3), a lowest voltage as the dimming output voltage (V3).

13 Claims, 8 Drawing Sheets

DIMMING CIRCUIT

BACKGROUND

Technical Field

The present disclosure relates to a dimming circuit.

Description of the Prior Art

Various conventional dimming circuits for adjusting the brightness of light emitting elements have been proposed.

Moreover, patent document 1 provides an example of the related art.

PRIOR ART DOCUMENT

Patent publication

[Patent document 1] Japan Patent Publication No. 2015-74309

SUMMARY

Problems to be Solved by the Present Disclosure

However, there is a need for improvement with respect to the precision of current dimming circuits.

In view of the issue discovered by the Applicant of the present disclosure, it is an object of the present disclosure to provide a high-precision dimming circuit.

Technical Means for Solving the Problem

A dimming circuit in the present disclosure is configured as below (first configuration), that is, including: an input stage, including a plurality of amplifiers, having non-inverted input terminals thereof inputted with different dimming input voltages, respectively, and inverted input terminals thereof inputted with a common dimming output voltage; and an output stage, connected between respective output terminals of the plurality of amplifiers and an output node of the dimming output voltage, and outputting, among the plurality of dimming input voltages respectively inputted to the plurality of amplifiers, a lowest voltage as the dimming output voltage.

Furthermore, the dimming circuit including the first configuration may be configured as below (second configuration), that is, wherein the input stage receives inputs of an external dimming input voltage of at least one system and an internal dimming input voltage equivalent to an upper limit of the dimming output voltage, as the plurality of dimming input voltages.

Furthermore, the dimming circuit including the second configuration may be configured as below (third configuration), that is, wherein the external dimming input voltage is an analog voltage corresponding to any one of a luminous flux level of a light-emitting element, a control signal of a microcomputer, a voltage divider ratio of a resistor circuit, or a temperature.

Furthermore, the dimming circuit including any one of the first to third configurations may be configured as below (fourth configuration), that is, wherein the output stage includes: a plurality of input transistors, having control terminals thereof connected to the respective output terminals of the plurality of amplifiers, and first terminals thereof connected to ground terminals; and an output transistor, having a control terminal thereof connected to respective second terminals of the plurality of input transistors, a first terminal thereof connected to a power terminal, and a second terminal thereof connected to the output node of the dimming output voltage.

Furthermore, a light-emitting element driving control circuit in the present disclosure is configured as below (fifth configuration), that is, including: the dimming circuit of any one of the first to fourth configurations; a sensing amplifier, generating a sensing voltage corresponding to an output current flowing in a light-emitting diode; an error amplifier, generating an error voltage between the sensing voltage and the dimming output voltage; and an output feedback control portion, performing output feedback control of the output current according to the error voltage.

Furthermore, the light-emitting element driving control circuit including the fifth configuration may be configured as below (sixth configuration), that is, further including: an offset adding portion, adding an offset voltage to the sensing voltage or the dimming output voltage.

Furthermore, a light-emitting element driving device in the present disclosure may be configured as below (seventh configuration), that is, including: a switch output stage, providing the output current to the light-emitting element; and the light-emitting element driving control device including the fifth or sixth configuration and driving the switch output stage.

Furthermore, a light-emitting device in the present disclosure may be configured as below (eighth configuration), that is, including the light-emitting element driving device of the seventh configuration, and a light-emitting element receiving the supply of the output current from the light-emitting element driving device.

Furthermore, the light-emitting device including the eighth configuration may be configured as below (ninth configuration), that is, wherein the light-emitting element is, for example, an LED (light-emitting diode) or an organic EL (electro-luminescence) element.

Furthermore, a vehicle in the present disclosure may be configured as including the light-emitting device of the eighth or ninth configuration (tenth configuration).

Furthermore, the vehicle including the tenth configuration may be configured as below (eleventh configuration), that is, wherein the light-emitting device is at least one of a head lamp, a daytime driving lamp, a tail lamp, a stop lamp and a turn lamp.

DETAILED DESCRIPTION OF THE EMBODIMENTS

<LED Light-Emitting Device>

Figure 1:
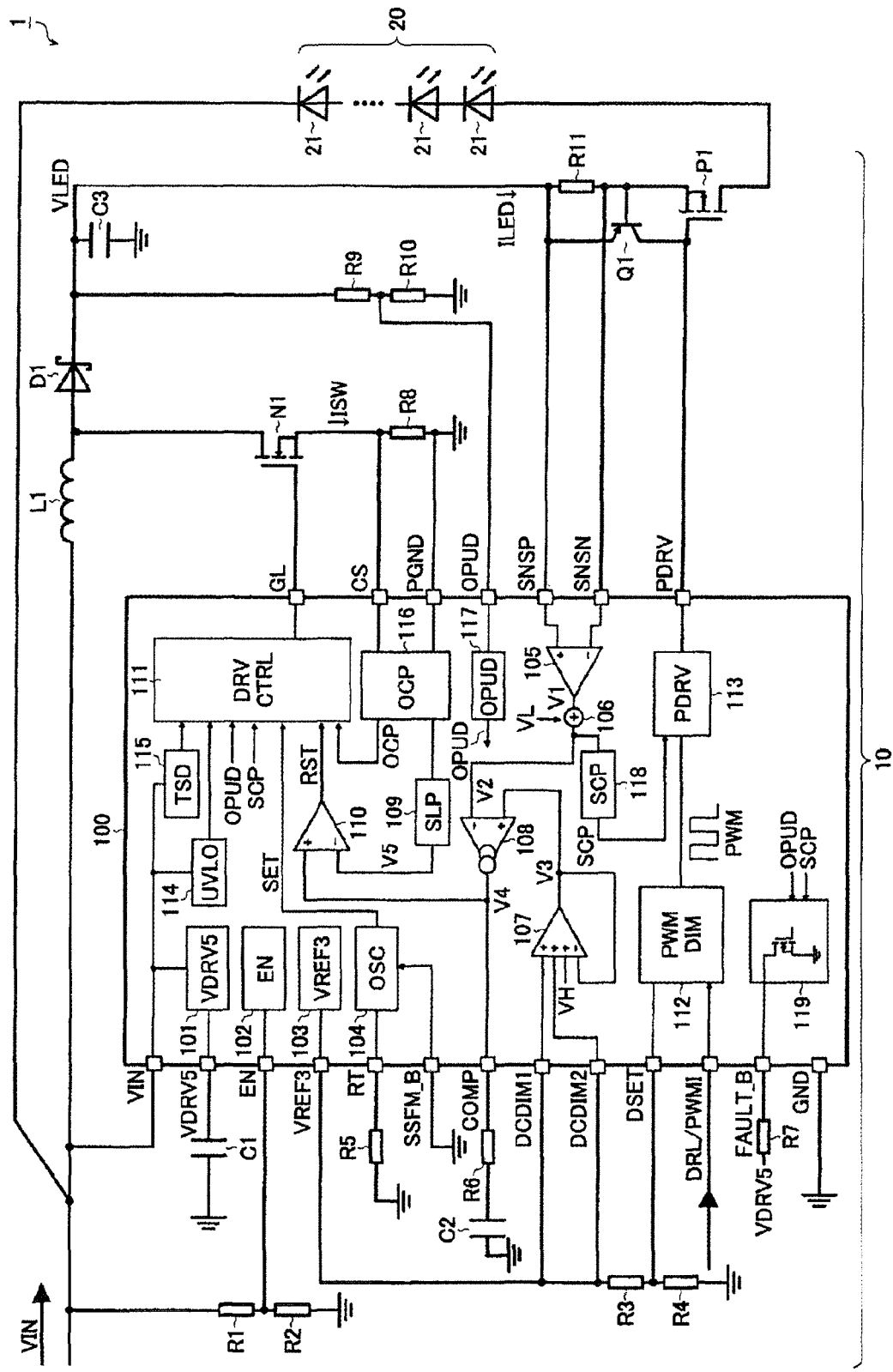
FIG. 1 is a diagram of an overall configuration of an LED light-emitting device.

FIG. 1 shows a diagram of an overall configuration of an LED light-emitting device. The LED light-emitting device 1 of this configuration example includes an LED driving device 10, and an LED light-emitting portion 20 (depicted as an LED light string formed by connecting a plurality of LEDs 21 in series) driven by the LED driving device 10.

<LED Driving Device>

The LED driving device 10 is described with reference to FIG. 1 below. The LED driving device 10 of this configuration example is formed by mounting an LED driving control device 100 and various external discrete components (capacitors C1 to C3, a diode D1 (for example, a Schottky diode), an inductor L1, an N-channel MOSFET (metal-oxide semiconductor field-effect transistor) N1, a P-channel MOSEFT P1, a pnp bipolar transistor Q1, and resistors R1 to R11) on a control substrate, and provides a fixed output current ILED to the LED light-emitting portion 20.

The LED driving control device 100 is a silicon single-chip integrated circuit that is the main body of the LED driving device 10 (a so-called LED driver control integrated circuit), functions as a means for determining electrical connection to the outside of the integrated circuit, and includes a plurality of external terminals (VIN, VDRV5, EN, VREF3, RT, SSFM_B, COMP, DCDIM1, DCDIM2, DSET, DRL/PWMI, FAULT_B, GND, GL, CS, PGND, OPUD, SNSP, SNSN, and PDRV).

The VIN pin is a power input terminal. The VDRV5 pin is a driving voltage output terminal. The EN pin is an enable input terminal. The VREF3 pin is a reference voltage output terminal. The RT pin is a switch frequency setting terminal. The SSFM_B pin is a spread spectrum modulation setting terminal. The COMP pin is a phase compensation circuit connecting terminal for frequency stabilization. The DCDIM1 pin and the DCDIM2 pin are DC dimming input terminals. The DSET pin is a duty setting terminal for PWM (pulse width modulation) dimming. The DRL/PWMI pin is a DRL (daytime running lamp)/PWM dimming input terminal. The FAULT_B pin is an open-drain terminal for outputting an abnormal flag. The GND pin is a ground terminal of a signal system. The GL pin is a gate driving output terminal of an output switch. The CS pin is a switch current detection terminal. The PGND pin is a ground terminal of a power system. The OPUD pin is an output voltage detection terminal for OVP (over voltage protection)/UVD (under voltage protection). The SNSP pin is an output current detection terminal (+). The SNSN pin is an output current detection input terminal (−). The PDRV pin is a gate driving output terminal of a PWM dimming switch.

Moreover, regarding packaging of the LED driving control device 100, a heat-sink thin shrink small outline package (HTSSOP) or a very thin quad flat non-leaded (VQFN) package having a rear cooling pad may be used.

The external connection of the LED driving control device 100 is described below. The VIN pin is connected to an application terminal of an input voltage VIN (for example, 5 to 65 V). The capacitor C1 is connected between the VDRV5 pin and a ground terminal. The resistors R1 and R2 are connected between the application terminal of the input voltage VIN and a ground terminal, and a connecting node therebetween is connected to the EN pin. The resistors R3 and R4 are connected between VREF3 pin and a ground terminal, and a connecting node therebetween is connected to the DSET pin. The resistor R5 is connected between the RT pin and a ground terminal. The resistor R6 and the capacitor C2 are connected between the COMP pin and a ground terminal. The resistor R7 is connected between the FAULT_B pin and the VDRV5 pin. The DCDIM1 pin and the DCDIM2 pin are both connected to the VREF3 pin. The GND pin is connected to a ground terminal.

A first terminal of the inductor L1 is connected to the application terminal of the input voltage VIN. A second terminal of the inductor L1 is connected to the drain of the transistor N1 and the anode of the diode D1. The gate of the transistor N1 is connected to the GL pin. The source of the transistor N1 and a first terminal of the resistor R8 are connected to the CS pin. A second terminal of the resistor R8 and the PGND pin are connected to a ground terminal. The cathode of the diode D1 is connected to an application terminal of the output voltage VLED (for example, up to 65 V). The resistors R9 and R10 are connected between the application terminal of the output voltage VLED and a ground terminal, and a connecting node therebetween is connected to the OPUD pin. The capacitor C3 is connected between the application terminal of the output voltage VLED and a ground terminal.

A first terminal of the resistor R11 and the SNSP pin are connected to the application terminal of the output voltage VLED. A second terminal of the resistor R11 and the SNSN pin are connected to the source of the transistor P1. The gate of the transistor P1 is connected to the PDRV pin. The drain of the transistor P1 is connected to the anode (the anode of the most upstream LED 21) of the LED light-emitting portion 20. The cathode (the cathode of the most downstream LED 21) of the LED light-emitting portion 20 is connected to the application terminal of the input voltage VIN. The emitter of the transistor Q1 is connected to the SNSP pin. The collector of the transistor Q1 is connected to the PDRV pin. The base of the transistor Q1 is connected to the source of the transistor P1.

Among the discrete components connected in the manners mentioned above, the transistor N1, the inductor L1, the diode D1 and the capacitor C3 enable the input voltage VIN to rise to generate the output voltage VLED, and serve as a step-up switch output stage that provides an output current ILED to the LED light-emitting portion 20.

However, the rectification means of a switch output stage is not limited to diode rectification, and synchronous rectification may also be used. In this case, the diode D1 is replaced by a synchronous rectification transistor.

<LED Driving Control Device (Overall Configuration)>

The internal configuration of the LED driving control device 100 is described with reference to FIG. 1 below. The LED driving control device 100 of this configuration example is formed by integrating a driving voltage generating portion 101, an enable control portion 102, a reference voltage generating portion 103, an oscillator 104, a sensing amplifier 105, an offset adding portion 106, a DC dimming circuit 107, an error amplifier 108, a slope voltage generating portion 109, a comparator 110, a driving controller 111, a PWM dimming circuit 112, a driver 113, an UVLO (under voltage locked-out) portion 114, a TSD (thermal shut down)

portion 115, an OCP (over current protection portion 116, an OVP/UVD portion 117, a SCP (short circuit protection) 118, and an abnormal flag output portion 119.

The driving voltage generating portion 101 generates a driving voltage VDRV5 (for example, 5 V) from the input voltage VIN, and outputs the driving voltage VDRV5 to the VDRV5 pin. The driving voltage VDRV5 is used as an internal power voltage of the LED driving control device 100. Ideally, an external phase compensation capacitor C1 is connected to the VDRV5 pin to prevent oscillation of the driving voltage VDRV5.

The enable control portion 102 switches enable/disable of the LED driving control device 100 according to a logic level (whether the input voltage VIN is applied in this drawing) of the EN pin.

The reference voltage generating portion 103 generates a reference voltage VREF3 (for example, 3 V) from the input voltage VIN, and outputs the reference voltage VREF3 to the VREF3 pin.

The oscillator 104 generates and outputs a set signal SET of a switch frequency Fsw to the driving controller 111. Furthermore, the switch frequency Fsw is a variable value (for example, 200 kHz to 2.2 MHz) corresponding to the resistance value of the resistor R5 externally connected to the RT pin. Furthermore, whether spread spectrum modulation of the switch frequency Fsw is to be performed may be switched as desired according to the logic level of the SSFM_B pin.

The sensing amplifier 105 amplifies an inter-terminal voltage (=SNSP-SNSN) of the SNSP pin and the SNSN pin by a gain α (for example, α=12), accordingly generating a sensing voltage V1 (=α×ILED×R11) corresponding to the output current ILED flowing in the LED light-emitting portion 20.

The offset adding portion 106 generates an offset sensing voltage V2 (=V1+VL) by adding a positive offset voltage VL (for example, 0.2 V) to the sensing voltage V1. Furthermore, the offset adding portion 106 may also be in a configuration that adds a negative offset voltage -VL to a dimming output voltage V3.

The DC dimming circuit 107 uses a lowest voltage among the plurality of dimming input voltages (DCDIM1, DCDIM2 and VH) as the dimming output voltage V3 and outputs the dimming output voltage V3. Furthermore, for illustration purposes in this drawing, the DC dimming circuit 107 is simply depicted as a single buffer amplifier including non-inverted input terminals (+) of three systems. However, to enhance the precision of DC dimming, the circuit configuration needs to be designed for the DC dimming circuit 107. In this regard, associated details are to be given in examples of novel embodiments below. Moreover, when the DC dimming circuit 107 is not used, as shown in this drawing, for example, the DCDIM1 pin and the DCDIM2 pin are short-circuited to become the VREF3 pin.

The error amplifier 108 outputs an error current corresponding to a difference between the offset sensing voltage V2 inputted to an inverted input terminal (-) and the dimming output voltage V3 inputted to a non-inverted input terminal (+), thereby generating an error voltage V4 in the COMP pin. The error voltage V4 lowers when V2>V3, and rises when V2<V3. Moreover, ideally, the resistor R6 and the capacitor C2 for phase compensation are externally connected to the COMP pin, so as to prevent oscillation of the error voltage V4.

The slope voltage generating portion 109 generates a slope voltage V5 including current information of a flowing switch current ISW when the transistor N1 is turned on.

The comparator 110 compares the error voltage V4 inputted to the non-inverted input terminal (+) with the slope voltage V5 inputted to the inverted input terminal (-) to generate a reset signal RST. The reset signal RST becomes high-level when V4>V5, and becomes low-level when V4<V5.

The driving controller 111 performs driving control of a switch output stage (particularly the transistor N1 externally connected to the GL pin) according to the set signal SET and the reset signal RST. Furthermore, the driving controller 111 also has a function of forcibly suspending the switch output stage according to detection results of various protection circuits (UVLO, TSD, OCP, OPUD and SCP).

In addition, in the function module, the oscillator 104, the slope voltage generating portion 109, the comparator 110 and the driving controller 111 function as an output feedback control portion that performs output feedback control of the output current ILED according to the error voltage V4.

The PWM dimming circuit 112 generates a pulse modulation signal PWM with an on duty cycle corresponding to the terminal voltage of the DSET pin, and outputs the pulse modulation signal PWM to the driver 113. Furthermore, the PWM dimming circuit 112 also provides a function of outputting the pulse modulation signal PWM externally inputted to the DRL/PWMI pin to the driver 113 in intact.

The driver 113 periodically turns on/off, according to the pulse modulation signal PWM, the transistor P1 externally connected to the PDRV pin. A supply path of the output current ILED is connected/disconnected by turning on/off the transistor P1, and thus the LED light-emitting portion 20 is periodically turned on and off. Furthermore, the on duration of each unit time gets longer as the on duty cycle of the pulse modulation signal PWM increases, and conversely, the on duration of each unit time gets shorter as the on duty cycle of the pulse modulation signal PWM decreases. Thus, the brightness of the LED light-emitting portion 20 may be adjusted according to the on duty cycle of the pulse modulation signal PWM.

As such, the DC dimming circuit 107 and the PWM dimming circuit 112 are built in the LED driving control device 100 as means for adjusting the brightness of the LED light-emitting portion 20.

The UVLO portion 114 is a low-voltage malfunction preventing circuit for monitoring the input voltage VIN to prevent integrated circuit malfunction when the power is supplied or when the power is instantaneously cut off. The UVLO portion 114 outputs a detection result to the driving controller 111 in order to suspend driving of the switch output stage upon detecting a low-voltage abnormality of the input voltage VIN.

The TSD portion 115 is a temperature protection circuit, which operates for receiving the supply from the input voltage VIN and monitors a junction temperature Tj of the LED driving control device 100, so as to prevent integrated circuit damage caused by abnormal heating. The TSD portion 115, for example, suspends driving of the switch output stage when the junction temperature Tj is 175° C. and resumes driving of the switch output stage when the junction temperature Tj is 150° C., and outputs the detection result to the driving controller 111.

The OCP portion 116 monitors a voltage (=ISW×R8) between two terminals of the resistor R8, and outputs the detection result to the driving controller 111 in order to limit the flowing switch current ISW to below a specific upper limit when the transistor N1 is turned on. Furthermore, to provide over current protection, a pulse-type over current protection operation (a so-called hiccup operation) is set, and if the over current state persists, over current protection is switched to a timing latch-type over current protection operation.

The OVP/UVD portion 117 monitors a terminal voltage (=VLED×{R10/(R9+R10)}) of the OPUD pin, detects an over-voltage abnormality and an under-voltage abnormality of the output voltage VLED, and outputs the detection result to the driving controller 111 and the abnormal flag output portion 119.

The SCP portion 118 monitors the offset sensing voltage V2, detects a short-circuit abnormality and an open-circuit abnormality of the LED light-emitting portion 20, and outputs the detection result to the driving controller 111, the driver 113 and the abnormal flag output portion 119.

The abnormal flag output portion 119 drives the open-drain transistor according to the abnormality detection results of the portions of the LED driving control device 100, and outputs an abnormal flag from the FAULT_B pin. For example, the abnormal flag output portion 119 sets, upon detecting an abnormality in any one of the OVP/UVD portion 117 and the SCP portion 118, the FAULT_B pin to low-level, and reports the abnormality to the outside of the integrate circuit. On the other hand, when no abnormality of any one of the portions is detected, the abnormal flag output portion 119 sets the FAULT_B pin to high-level, and reports to the outside of the integrated circuit that no abnormality has been detected (or the abnormality has been eliminated).

<DC Dimming Circuit (Comparative Example)>

Figure 2:
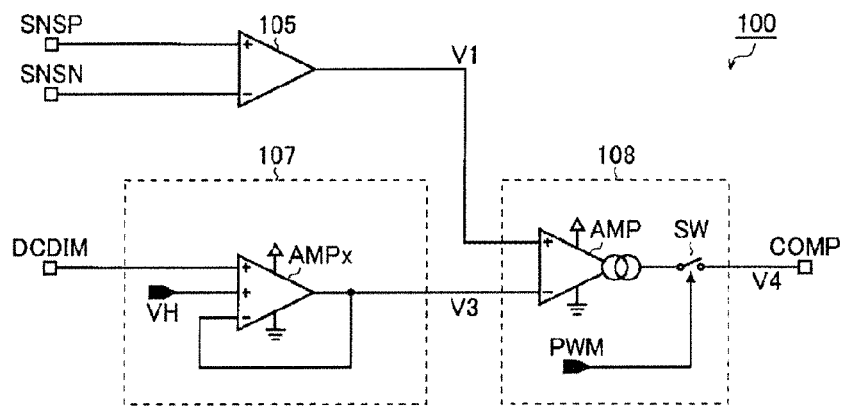
FIG. 2 is a diagram of a comparative example of a DC (direct current) dimming circuit.

Before the novel embodiments of the DC dimming circuit 107 are described below, a corresponding comparative example is first described. FIG. 2 shows a diagram of a comparative example of the DC dimming circuit and the peripheral circuits thereof.

The DC dimming circuit 107 of this comparative example includes a single amplifier AMPx having non-inverted input terminals (+) of two systems. The first non-inverted input terminal (+) of the amplifier AMPx is connected to the DCDIM pin, and is inputted with an external dimming input voltage DCDIM. The second non-inverted input terminal (+) of the amplifier AMPx is inputted with an internal dimming input voltage VH (for example, 2.2 V) equivalent to the upper limit of the dimming output voltage V3. An inverted input terminal (−) and an output terminal of the amplifier AMPx are both connected to an output node of the dimming output voltage V3. The amplifier AMPx connected in the above manner operates so that the lower between the external dimming input voltage DCDIM and the internal dimming input voltage VH and the dimming output voltage V3 cause a virtual short circuit.

The error amplifier 108 includes a gm amplifier (operational transconductance amplifier) AMP and a switch SW. The gm amplifier AMP outputs an error current corresponding to a difference between the sensing voltage V1 inputted to the non-inverted input terminal (+) from the sensing amplifier 105 and the dimming output voltage V3 inputted to the inverted input terminal (−) from the DC dimming circuit 107, thereby generating an error voltage V4 in the COMP pin. Furthermore, the switch SW is connected between an output terminal of the gm amplifier APM and the COMP pin, and is turned on/off according to the pulse modulation signal PWM.

Figure 3:
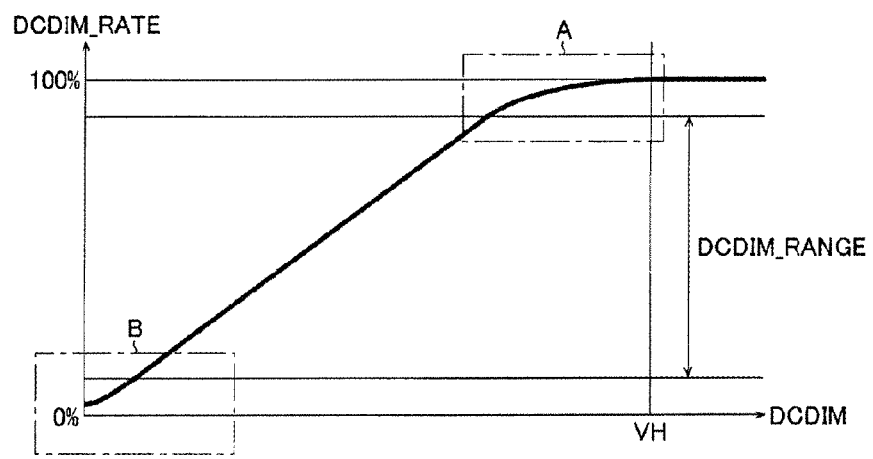
FIG. 3 is a diagram of DC dimming characteristics of the comparative example.

FIG. 3 shows a diagram of DC dimming characteristics of the comparative example. Furthermore, the horizontal axis represents the external dimming input voltage DCDIM and the vertical axis represents the dimming rate.

In the comparative example, a configuration that selects the lower between the external dimming input voltage DCDIM and the internal dimming input voltage VH is used on the input side of the amplifier AMPx. In such circuit configuration, when the external dimming input voltage DCDIM is near the upper limit (equivalent to the internal dimming input voltage VH), the gain of the amplifier AMPx becomes inadequate such that the linearity of the DC dimming characteristics cannot be maintained, leading to a deviation in a DC dimming initial voltage (refer to the single dotted frame A in the drawing).

On the other hand, quite contrary to the above, when the external dimming input voltage DCDIM is near 0 V, the change in the offset of the amplifier AMPx become sizeable. For example, even when the external dimming input voltage DCDIM is set to 0 V and the dimming output voltage V3 does not lower to 0 V, it is impossible to set the LED light-emitting portion 20 to a totally black-out state (with a dimming rate of 0%) (refer to the single dotted frame B in the drawing).

For the reason above, in the comparative example, it is difficult to set the dimming rate of the LED light-emitting portion 20 by a total range (0% to 100%), and the actual DC dimming range becomes smaller.

Furthermore, in the comparative example, only the external dimming input voltage DCDIM of one system can be received. Thus, for example, multiple discrete components are needed in order to include both of the luminous flux level determination function and temperature release function. Further description is given with the accompanying drawing below.

Figure 4:
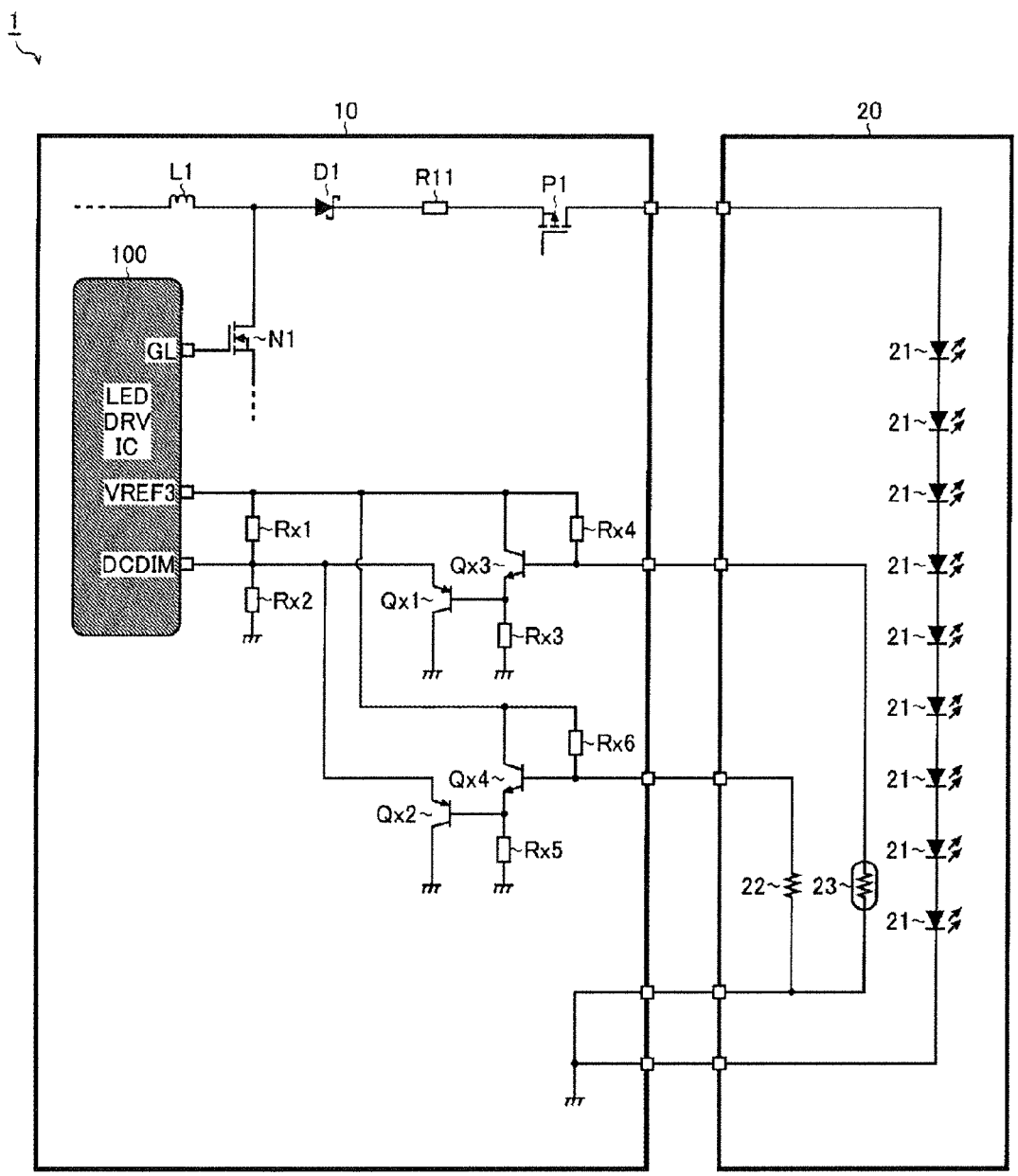
FIG. 4 is a diagram of the comparative example including both of the level determination and temperature release.

FIG. 4 shows a diagram of discrete components of the comparative example (single DC dimming) in order to include both of the luminous flux level determination function and temperature release function.

The LED light-emitting portion 20 is formed by further mounting, in addition to the plurality of LEDs 21, a BIN resistor 22 and a NTC (negative temperature coefficient) thermistor 23 on the LED substrate.

The BIN resistor 22 has a resistance value set with respect to the luminous flux level of each LED 21. More specifically, a resistance value RBIN of the BIN resistor 22 is set to a lower value as the quality of the LED 21 gets higher (high luminance), and the resistance value RBIN of the BIN resistor 22 is set to a higher value as the quality of the LED 21 gets lower (low luminance). As such, if the BIN resistor 22 is mounted in advance on the LED substrate, it would not be necessary to change the resistance value on the side of the control substrate with respect to the luminous flux level of each LED 21.

The resistance value of the NTC thermistor 23 changes under negative characteristics according to the temperature of the LED substrate. More specifically, a resistance value RNTC of the NTC thermistor 23 lowers as the temperature of the LED substrate increases, and the resistance value RNTC rises as the temperature of the LED substrate decreases. As such, temperature release is performed using the NTC thermistor 23, thus suppressing degradation of the LEDs 21 and achieving higher reliability.

On the other hand, in addition to the LED driving control device 100 and the discrete components (the transistor N1, the inductor L1 and the diode D1) forming the switch output stage, pnp bipolar transistors Qx1 and Qx2, npn bipolar transistors Qx3 and Qx4 and resistors Rx1 to Rx6 are further mounted on the control substrate of the LED driving device 10.

Respective first terminals of the resistors Rx1, Rx4 and Rx6 and respective collectors of the transistors Qx3 and Qx4 are all connected to the VREF3 pin of the LED driving control device 100. A second terminal of the resistor Rx1, a first terminal of the resistor Rx2 and respective emitters of the transistors Qx1 and Qx2 are all connected to the DCDIM pin of the LED driving control device 100. Respective collectors Qx1 and Qx2 and a second terminal of the resistor Rx2 are all connected to ground terminals. The base of the transistor Qx1 and the emitter of the transistor Qx3 are both connected to a first terminal of the resistor Rx3. The base of the transistor Qx2 and the emitter of the transistor Qx4 are both connected to a first terminal of the resistor R5. Respective second terminals of the resistors Rx3 and Rx5 are both connected to ground terminals. The base of the transistor Qx3 and a second terminal of the resistor Rx4 are both connected to the first terminal of the NTC thermistor 23. The base of the transistor Qx4 and a second terminal of the resistor Rx6 are both connected to the first terminal of the BIN resistor 22. Respective second terminals of the BIN resistor 22 and the NTC thermistor 23 are both connected to ground terminals.

As shown in this drawing, in the comparative example (single DC dimming), in order to include both of the luminous flux level determination function and temperature release function, it is necessary to provide numerous discrete components (four transistors and six resistors).

<DC Dimming Circuit (Embodiment)>

Figure 5:
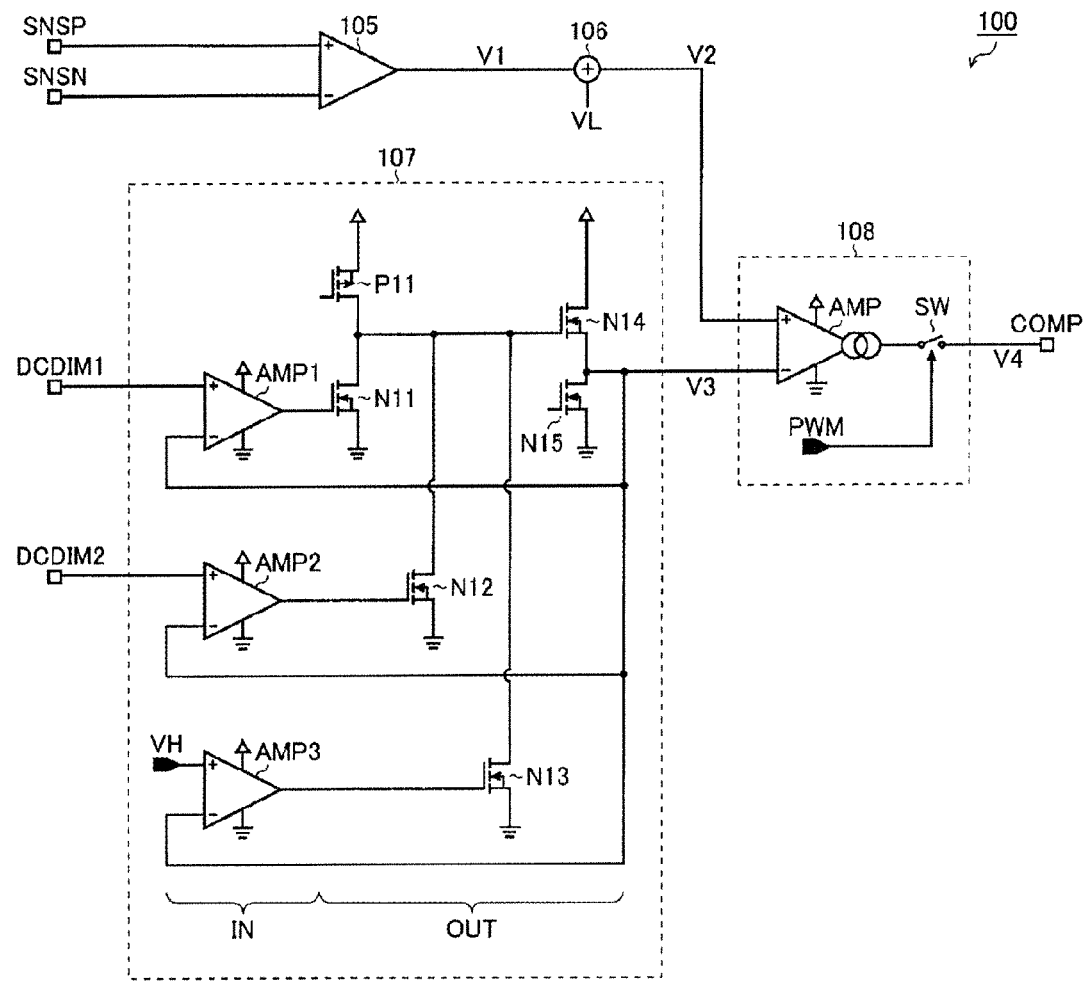
FIG. 5 is a diagram of a DC dimming circuit according to an embodiment.

Next, the novel embodiment of the DC dimming circuit 107 is described in detail below. FIG. 5 shows a diagram of the DC dimming circuit 107 and the peripheral circuits thereof according to an embodiment. The DC dimming circuit 107 of this embodiment includes an input stage IN and an output stage OUT.

The input stage IN includes three amplifiers AMP1 to AMP 3 which have non-inverted input terminals (+) thereof inputted with different dimming input voltages (DCDIM1, DCDIM2 and VH), respectively, and inverted input terminals (−) thereof inputted with a common diming output voltage V3. That is to say, the external dimming input voltages (DCDIM1 and DCDIM2) of two systems and the internal dimming input voltage VH (equivalent to the upper limit of the dimming output voltage V3) of one system are inputted to the input stage IN.

Furthermore, the external dimming input voltage (DCDIM*) may also be one system or may be three systems or more. However, if the external dimming input voltage (DCDIM*) is set in advance to two systems or more, the number of discrete components needed for including both of the luminous flux level determination function and temperature release function may be significantly reduced (with details to be given below).

The output stage OUT is a function module connected between the respective output terminals of the amplifiers AMP1 to AMP3 and the output node of the dimming output voltage V3, and includes N-channel MOSFETs N11 to N15 and a P-channel MOSFET P11.

The respective gates of the transistors N11 to N13 are connected to respective output terminals of the amplifiers AMP1 to AMP3. The respective sources of the transistors N11 to N13 are connected to ground terminals. The transistors N11 to N13 connected in above manner function as input transistors of the output stage OUT.

The gate of the transistor N14 is connected to the respective drains of the transistors N11 to N13. The drain of the transistor N14 is connected to a power terminal. The source of the transistor N14 is connected to an output node of the dimming output voltage V3. The transistor N14 connected in above manner functions as an output transistor of the output stage OUT.

The drain of the transistor N15 is connected to the output node of the dimming output voltage V3. The source of the transistor N15 is connected to a ground terminal. The gate of the transistor N15 is connected to a specific potential terminal. The source of the transistor P11 is connected to a power terminal. The drain of the transistor P11 is connected to the gate of the transistor N14. The gate of the transistor P11 is connected to a specific potential terminal. The transistors N15 and P11 connected in above manner function as an active load (current source). Furthermore, the transistors N15 and P11 may also be replaced by passive loads such as resistors.

To keep the description simple, the operation principle of the output stage OUT is described by focusing only on the external dimming input voltages DCDIM1 and DCDIM2. The amplifier AMP1 controls the gate of the transistor N11 so that the external dimming input voltage DCDIM1 and the dimming output voltage V3 are virtually short-circuited. Similarly, the amplifier AMP2 controls the gate of the transistor N12 so that the external dimming input voltage DCDIM2 and the dimming output voltage V3 are virtually short-circuited.

A situation where DCDIM2>DCDIM1 (=V3) is first considered. In this case, the amplifier AMP2 continues lowering the gate voltage of the transistor N12 with the aim of increasing the dimming output voltage V3 to the external dimming input voltage DCDIM2, and thus the transistor N12 becomes a completely cut-off state. As a result, in the output stage OUT, output feedback control performed by the amplifier AMP1 and the transistor N11 become advantageous, and the dimming output voltage V3 matches with the external dimming input voltage DCDIM1 that is the lower one between the external dimming input voltages DCDIM1 and DCDIM2.

Next, a situation where DCDIM1>DCDIM2 (=V3) is considered. In this case, the amplifier AMP1 continues lowering the gate voltage of the transistor N11 with the aim of increasing the dimming output voltage V3 to the external dimming input voltage DCDIM1, and thus the transistor N11 becomes a completely cut-off state. As a result, in the output stage OUT, output feedback control performed by the amplifier AMP2 and the transistor N12 become advantageous, and the dimming output voltage V3 matches with the external dimming input voltage DCDIM2 that is the lower one between the external dimming input voltages DCDIM1 and DCDIM2.

Furthermore, the same applies to the relationship of the external dimming input voltages DCDIM1 and DCDIM2 and the internal dimming input voltage VH.

According to the described operation principle, the output stage OUT in the above configuration outputs, among the dimming input voltages (DCDIM1, DCDIM2 and VH) inputted to the amplifiers AMP1 to AMP3, the lowest voltage as the dimming output voltage V3.

Figure 6:
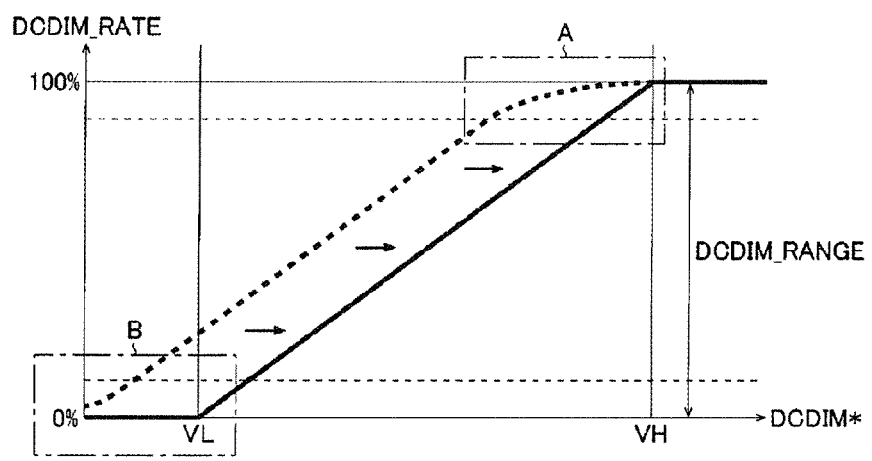
FIG. 6 is a diagram of DC dimming characteristics according to the embodiment.

FIG. 6 shows a diagram of DC dimming characteristics (solid line) of the embodiment. Furthermore, the horizontal axis represents the external dimming input voltage DCDIM* (where * is 1 or 2), and the vertical axis represents the dimming rate. Moreover, the dotted line in the drawing represents the DC dimming characteristics of the comparative example.

In this embodiment, a configuration that selects, the lowest voltage among the external dimming input voltages DCDIM1 and DCDIM2 and the internal dimming input voltage VH from the output stages OUT provided on the respective output sides of the amplifiers AMP1 to AMP3. With such circuit configuration, even if the external dimming input voltage DCDIM is near the upper limit (equivalent to the internal dimming input voltage VH), the linearity of the DC dimming characteristics may still be maintained, hence suppressing the deviation of the DC dimming initial voltage (refer to the single dotted frame A in the drawing).

Furthermore, in this embodiment, a positive offset voltage VL (for example, 0.2 V) is added to the sensing voltage V1. Thus, in a voltage range of DCDIM*<VL, even if there is a slight deviation in the dimming output voltage V3 because of the offset change of the amplifier AMPx, the LED light-emitting portion 20 may still become a completely black-out state (dimming rate 0%) (refer to the single dotted frame B in the drawing).

As such, this embodiment is capable of expanding the dimming rate of the LED light-emitting portion 20 to a full range (0% to 100%), hence realizing illumination by phases and total black-out of the LED light-emitting portion 20, further enabling extensive application of the light-emitting device 10 to various purposes.

Furthermore, this embodiment is capable of simultaneously receiving the external dimming input voltages DCDIM1 and DCDIM2 of two systems, and thus the number of discrete components needed for including both of the luminous flux level determination function and temperature release function may be significantly reduced. Associated details are given with the accompanying drawing below.

Figure 7:
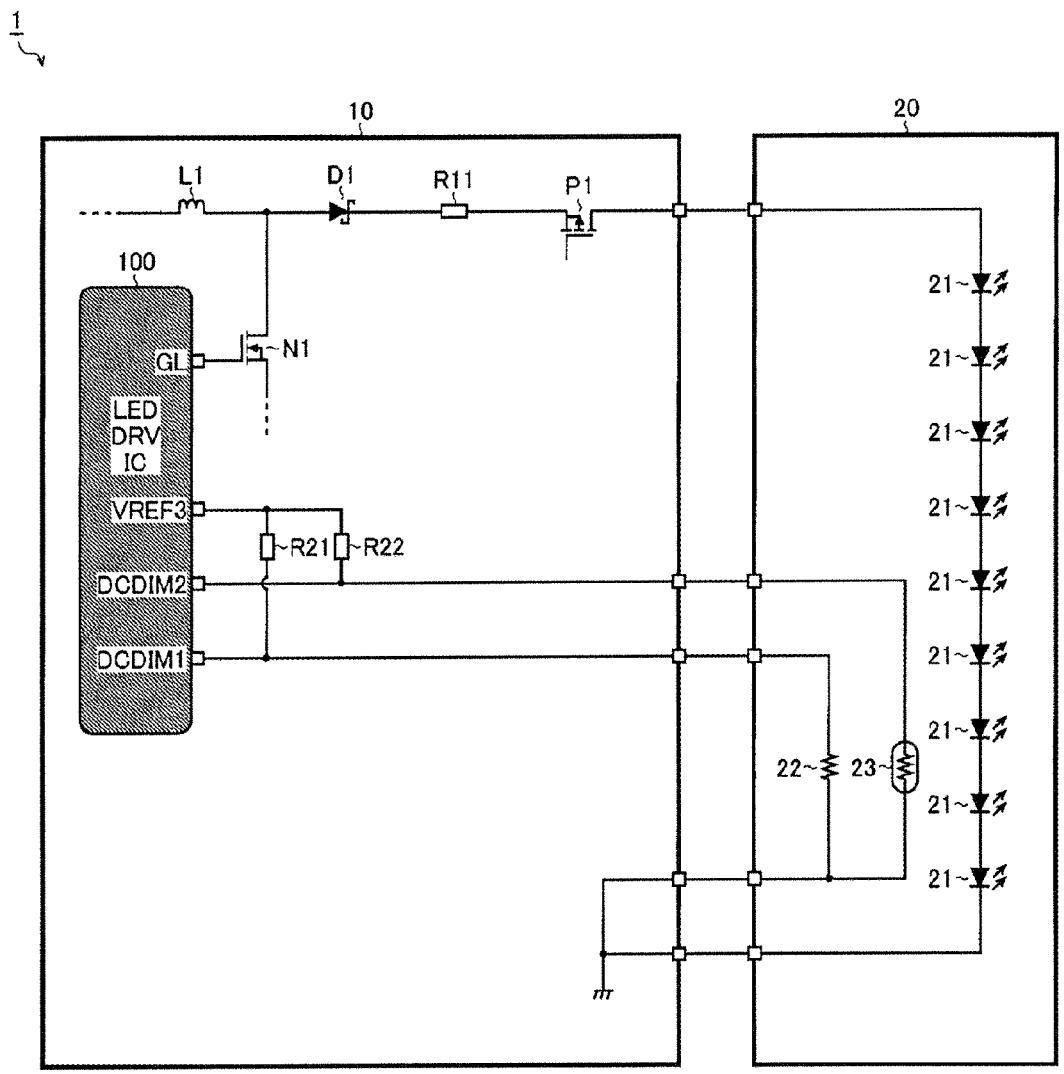
FIG. 7 is a diagram including both of the level determination and temperature release according to the embodiment.

FIG. 7 shows a diagram of discrete components needed for including both of the luminous flux level determination function and temperature release function of the embodiment (dual DC dimming). Since the configuration of the LED light-emitting portion 20 is identical to that in FIG. 4, repeated description is omitted, and the discrete components mounted on the control substrate of the LED driving device 10 are described below.

In addition to the LED driving control device 100 and the discrete components (the transistor N1, the inductor L1 and the diode D1) forming the switch output stage, resistors R21 and R22 are further mounted on the control substrate of the LED driving device 10.

The resistor R21 is connected between the VREF3 pin and the DCDIM1 pin of the LED driving control device 100, and the DCDIM1 pin is connected to the first terminal of the BIN resistor 22 (with a resistance value RBIN). Thus, a divided voltage (=VREF3×{RBIN/(R21+RBIN)}) of the reference voltage VREF3 is inputted to the DCDIM1 pin. That is to say, the external dimming input voltage DCDIM1 decreases as the quality of the LED 21 gets higher (high luminance), and the external dimming input voltage DCDIM1 increases as the quality of the LED 21 gets lower (low luminance).

The resistor 22 is connected between the VREF3 pin and the DCDIM2 pin of the LED driving control device 100, and the DCDIM2 pin is connected to the first terminal of the NTC thermistor 23 (with a resistance value RNTC). Thus, a divided voltage (=VREF3×{RNTC/(R22+RNTC)}) of the reference voltage VREF3 is inputted to the DCDIM2 pin. That is to say, the external dimming input voltage DCDIM2 decreases as the temperature of the LED substrate gets higher, and the external dimming input voltage DCDIM2 increases as the temperature of the LED substrate gets lower.

As shown in this drawing, in this embodiment (dual DC dimming), the discrete components needed for including both of the luminous flux level determination function and temperature release function are only two resistors, which significantly reduces the number of discrete components compared to the comparative example (FIG. 4) (further controlling the area of the substrate).

<Utilization Example>

In the description above, an example of inputting an analog voltage corresponding to the luminous flux level of the LEDs 21 is inputted to the DCDIM1 pin and an analog voltage corresponding to the temperature of the LED substrate is inputted to the DCDIM2 pin, thereby including both of the luminous flux level determination function and temperature release function is provided. However, respective purposes of the DCDIM1 pin and the DCDIM2 pin are not limited to the above example, and various applications may be performed.

For example, an analog voltage corresponding to a control signal of a microcomputer may be inputted to the DCDIM1 pin, and an analog voltage corresponding to the temperature of the LED substrate may be inputted to the DCDIM2 pin, and both of the dimming function and temperature release function of the microcomputer may be achieved.

Furthermore, for example, an analog voltage corresponding to a voltage divider ratio of a resistor circuit may be inputted to the DCDIM1 pin, and an analog voltage corresponding to the temperature of the LED substrate may be inputted to the DCDIM2 pin, and both of the analog dimming function and temperature release function of the resistor circuit may be achieved.

As such, diversified dimming application may be realized by preparing the DCDIM1 pin and the DCDIM2 pin of two systems in advance.

<Purpose>

Figure 8:
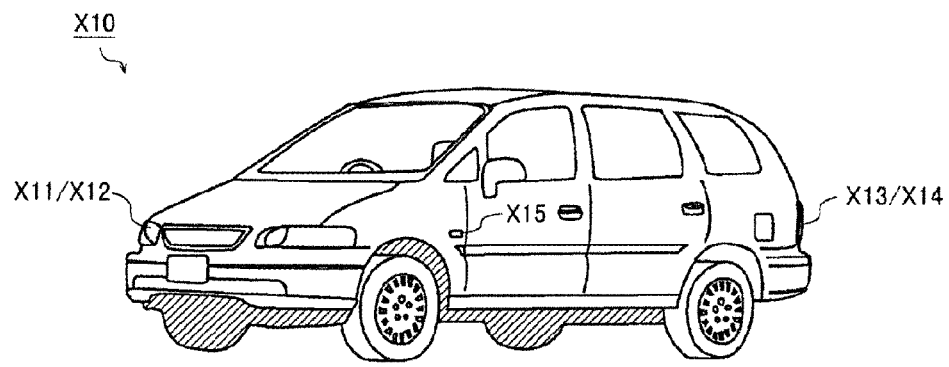
FIG. 8 is an appearance diagram (front view) of a vehicle having a light-emitting device.
Figure 9:
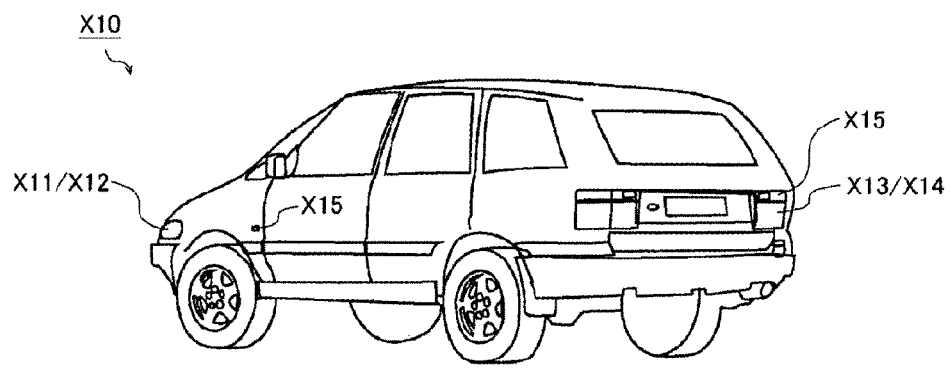
FIG. 9 is an appearance diagram (rear view) of a vehicle having a light-emitting device.

As shown in FIG. 8 and FIG. 9, the light-emitting device 1 may be appropriately used as a head lamp (appropriately including a high beam, a low beam, a stop lamp and a fog lamp) X11 of a vehicle X10, a daytime driving lamp (DRL) X12, a tail lamp (appropriately including a stop lamp or a reversing lamp) X13, a stop lamp X14, and a turn lamp X15. Furthermore, the light-emitting device 1 may also be appropriately used as a dynamic tail lamp (not shown).

Figure 10:
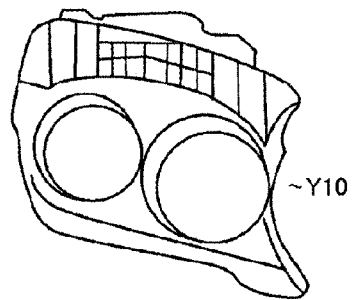
FIG. 10 is an appearance diagram of an LED head lamp module.
Figure 11:
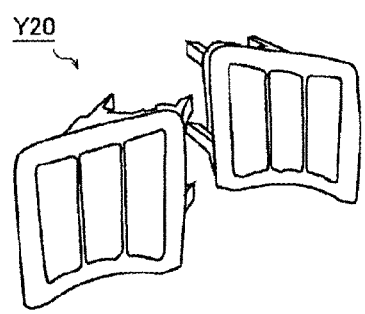
FIG. 11 is an appearance diagram of an LED turn lamp module.
Figure 12:
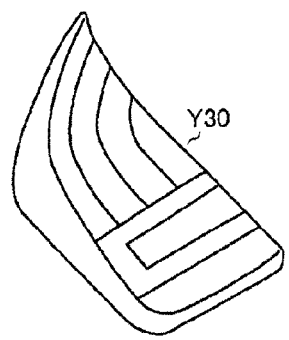
FIG. 12 is an appearance diagram of an LED tail lamp module.

Moreover, the LED driving control device 100 may be provided together with the LED light-emitting portion 20 as a driving target in a form of a module (an LED head lamp module Y10 in FIG. 10, an LED turn lamp module Y20 in FIG. 11, and an LED tail lamp module Y30 in FIG. 12), or may be provided separately from the LED light-emitting portion 20 and be provided in a form of a single integrated circuit.

<Other Variation Examples>

Furthermore, in the described embodiments, the configuration of using LEDs as light-emitting elements is given as an example; however, the configuration of the present invention is not limited thereto, for example, organic EL elements may also be used as light-emitting elements.

Furthermore, in addition the described embodiments, without departing from the scope of the subject matter of the technical invention, variations and modifications may also be made to various technical features disclosed by the present application. That is to say, all contents given in the described embodiments are considered exemplary and are not to be construed as limitations to the present invention. The technical scope of the present invention is not limited to the described embodiments, but should be understood as including all variations within the scope and meanings equivalent to the appended claims.

INDUSTRIAL APPLICABILITY

The dimming circuit described in the present disclosure may be used for in-vehicle external lamps (DRL/position lamps, turn lamps and tail lamps).

What is claimed is:

1. A dimming circuit, comprising:
   an input stage, comprising a plurality of amplifiers, having non-inverted input terminals thereof inputted with different dimming input voltages, respectively, and inverted input terminals thereof inputted with a common dimming output voltage; and
   an output stage, connected between respective output terminals of the plurality of amplifiers and an output node of the dimming output voltage, and outputting, among the plurality of dimming input voltages respectively inputted to the plurality of amplifiers, a lowest voltage as the dimming output voltage.

2. The dimming circuit according to claim 1, wherein the input stage receives inputs of an external dimming input voltage of at least one system and an internal dimming input voltage equivalent to an upper limit of the dimming output voltage, as the plurality of dimming input voltages.

3. The dimming circuit according to claim 2, wherein the external dimming input voltage is an analog voltage corresponding to any one of a luminous flux level of a light-emitting element, a control signal of a microcomputer, a voltage divider ratio of a resistor circuit, and a temperature.

4. The dimming circuit according to claim 1, wherein the output stage comprises:
   a plurality of input transistors, having control terminals thereof connected to the respective output terminals of the plurality of amplifiers, and first terminals thereof connected to ground terminals; and
   an output transistor, having a control terminal thereof connected to respective second terminals of the plurality of input transistors, a first terminal thereof connected to a power terminal, and a second terminal thereof connected to the output node of the dimming output voltage.

5. The dimming circuit according to claim 2, wherein the output stage comprises:
   a plurality of input transistors, having control terminals thereof connected to the respective output terminals of the plurality of amplifiers, and first terminals thereof connected to ground terminals; and
   an output transistor, having a control terminal thereof connected to respective second terminals of the plurality of input transistors, a first terminal thereof connected to a power terminal, and a second terminal thereof connected to the output node of the dimming output voltage.

6. The dimming circuit according to claim 3, wherein the output stage comprises:
   a plurality of input transistors, having control terminals thereof connected to the respective output terminals of the plurality of amplifiers, and first terminals thereof connected to ground terminals; and
   an output transistor, having a control terminal thereof connected to respective second terminals of the plurality of input transistors, a first terminal thereof connected to a power terminal, and a second terminal thereof connected to the output node of the dimming output voltage.

7. A light-emitting element driving control device, comprising:
   the dimming circuit of claim 1;
   a sensing amplifier, generating a sensing voltage corresponding to an output current flowing in a light-emitting element;
   an error amplifier, generating an error voltage between the sensing voltage and the dimming output voltage; and
   an output feedback control portion, performing output feedback control of the output current according to the error voltage.

8. The light-emitting element driving control device according to claim 7, further comprising:
   an offset adding portion, adding an offset voltage to the sensing voltage or the dimming output voltage.

9. A light-emitting element driving device, comprising:
   a switch output stage, providing the output current to the light-emitting element; and
   the light-emitting element driving control device of claim 7, driving the switch output stage.

10. A light-emitting device, comprising:
    the light-emitting element driving device of claim 9; and
    a light-emitting element, receiving the supply of the output current from the light-emitting element driving device.

11. The light-emitting device according to claim 10, wherein the light-emitting element is an LED or an organic EL element.

12. A vehicle, comprising the light-emitting device of claim 10.

13. The vehicle according to claim 12, wherein the light-emitting device is at least one of a head lamp, a daytime driving lamp, a tail lamp, a stop lamp and a turn lamp.

* * * * *